Oct. 23, 1951           F. K. MOGENSEN           2,572,177
METHOD OF CLASSIFYING OR SEPARATING COMMINUTED
MATERIAL ACCORDING TO SIZE
Filed Jan. 24, 1949

INVENTOR.
FREDRIK KRISTIAN MOGENSEN

BY

ATTORNEY.

Patented Oct. 23, 1951

2,572,177

UNITED STATES PATENT OFFICE 2,572,177

METHOD OF CLASSIFYING OR SEPARATING COMMINUTED MATERIAL ACCORDING TO SIZE

Fredrik Kristian Mogensen, Djursholm, Sweden

Application January 24, 1949, Serial No. 72,444

4 Claims. (Cl. 209—315)

This invention relates to a method of classifying or separating comminuted material according to size and collecting the granular particles in separate groups or fractions consisting of substantially equal sized particles and, more particularly, to the separation of crushed or ground ores, ore concentrates or other granular particles obtained from mineral dressing or chemical processes into two or more groups or fractions according to particle size.

Heretofore, the two major methods of ore sizing have been screening and classifying or sorting. Screening involves the subdivision of a mixture of particles into separate groups by means of a screen which separates the coarser particles, which are too large to pass through the screen apertures, from the finer particles which are small enough to actually pass through the screen apertures. Classifying or sorting according to these methods subjects the original mixture of particles to the action of a classifier in which the particle mixture is allowed to settle through a liquid or gaseous medium and particles of high settling velocity are caused to move in a direction different from those of low settling velocity. Under very favorable conditions these methods effect fairly good division of a particle mass into separate fractions.

However, the screening of such materials as crushed and ground ores and other mixtures of hard particles cannot be easily accomplished on a large scale when the screen apertures are smaller than from 0.05–0.02 inch because of the blinding or clogging of the apertures by particles and because of the low strength and low capacity of the wire cloth below the indicated range of screen aperture size. On the other hand, the conventional classification method is ineffective when the particles to be sized have different specific gravities since small and heavy particles will fall together with coarse and light particles.

Accordingly, it is among the objects of the present invention to provide an improved method of dividing or classifying a particle mixture into groups or fractions according to particle size which method will obviate the aforementioned difficulties and disadvantages inherent in conventional practice.

The features of the invention will be readily understood in the course of the following detailed description taken in connection with the accompanying drawing which illustrates one possible arrangement for carrying out the invention, and wherein.

Figure 1:
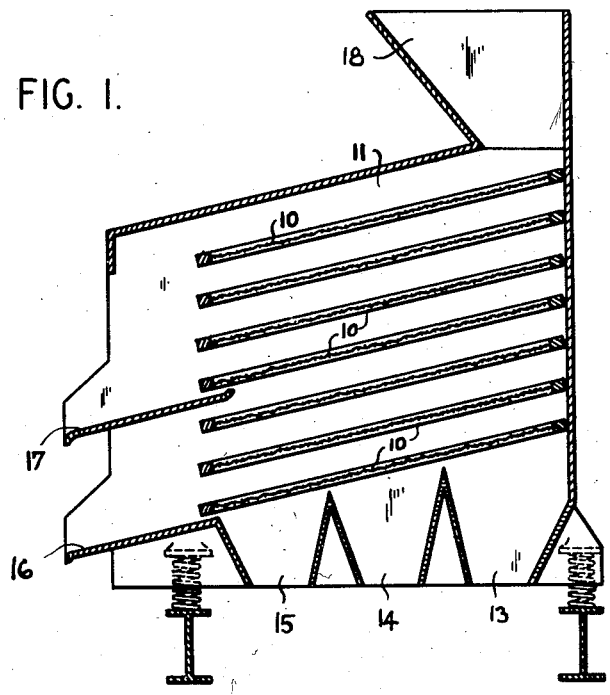
Fig. 1 is a diagrammatic representation in section of an apparatus for separating a particle mixture into groups or fractions according to particle size.
Figure 2:
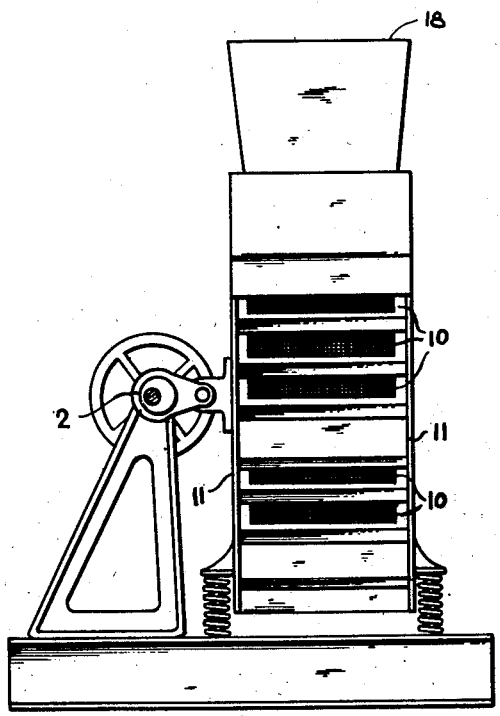
Fig. 2 is an end view thereof.

In carrying out my improved separation method, I cause the granular particle mixture which is to be separated or subdivided according to particle size to pass through a system defined by a plurality of obstacles spaced throughout an enclosure, which obstacles may be either stationary or moving. As the particles pass through this maze of obstacles, collisions will occur between the particles and the obstacles which will cause the individual particles to be deflected laterally. The frequency of collision for each particle will depend, among other things, on the particle size. The larger the size of the particle, the greater is the probability of collision against the obstacles and the greater will be the frequency of collision of a large particle during its passage through the system of obstacles. With each collision the course or path of the particle will be subjected to deviations and the particles will be retarded in their passage through the system.

Smaller particles will be retarded to a lesser extent and they will pass more directly through the system of obstacles than will the coarser particles. In this manner it is possible to divide the original heterogeneous mixture of particles into groups or fractions of relatively coarse and fine particles.

It is further possible to arrange the obstacles in such a manner that the collisions will preferably divert the particles passing through the system in a given direction. Particles frequently colliding with the maze of obstacles will traverse a path different from particles infrequently colliding with the obstacles. Stated in other terms, coarse particles will take a different path or direction than will the fine particles. The diversion of particle path will occur to a greater extent as the size of the particle increases and a successive fractionation of the original heterogeneous particle mixture by gradations of particle size may be accomplished by employing such a system of obstacles.

The obstacles may be disposed in the path of the particles in such a manner that the particles will collide with them at a suitable angle to be diverted or deflected in a given direction and to undergo a directed change of course as they traverse the system of obstacles, the extent of diversion for each particle depending upon the particle size and frequency of collision, as has been previously pointed out.

The obstacles may take any desired form such as thin, flat bars or wires supported on a suitable framework and preferably extending obliquely across the general direction of travel of the particles. From the point of view of ease of fabrication, the obstacle system or sizing apparatus may employ obstacles in the form of perforated plates or wire cloth. It is to be emphasized in this connection that the latter construction does not serve to separate the particles according to particle size as in conventional screening methods, since all of the particles to be sized are much smaller than the coarsest particles which can pass through the obstacle apertures. Thus, where the sizing apparatus is constructed with perforated plates or wire screening substantially all of the particles pass through the perforations or apertures and the particles are diverted progressively in a given direction according to increasing particle size by collision against the intervening portions of the plates or screens between the perforations or apertures, such intervening portions actually constituting the obstacles of the system.

The aforementioned principles of classifying or separating granular particles according to particle size may be utilized in a variety of ways. The drawing illustrates one possible form of apparatus embodying the principles of the invention. This sizing apparatus comprises a plurality of obstacles or penetrable members 10 supported on a suitable frame member which may take the form of a pair of parallel vertical walls 11. Penetrable members 10 may take the form of wire cloth having apertures of $1/20$ inch, for example, and are extended preferably obliquely between vertical walls 11. The granular particles passing through the maze of obstacles may be impacted by vibrating the walls 11 by means of the vibrator 12. The particle mixture, such as ground or crushed ore and the like, is fed to the apparatus at 18 and the particles traverse the system of obstacles 10 to be separated according to particle size and to ultimately discharge through the chutes 13, 14, 15, 16 and 17. The finest particles will have the most direct path of travel through the system of obstacles and will drop through chute 13 while the coarser particles will be progressively diverted in their passage through the system by collision against the obstacles 10 (actually the intervening portions of the screens between the apertures) to drop through the chutes 14, 15, 16 and 17, the coarsest particles being discharged through chute 17. By the practice of the invention in the manner described it has been possible to effect a differential separation between the particles discharged through chutes 13 and 14, for example, to the same extent as if the particle mixture had been screened through an $1/100$ inch screen.

It should, of course, be understood that the foregoing invention can be carried out submerged in water or other liquids, as well as in the atmosphere or by flushing in air, without departing from the scope thereof.

Since certain modifications may be made in the method and apparatus of the invention without departing from the scope thereof, it is intended that all matter contained in the foregoing specification and shown in the accompanying drawing be interpreted merely as illustrative and not in a limiting sense.

What is claimed is:

1. The method of classifying comminuted material composed of a mixture of granular particles of different size which comprises passing the mixture in a stream through a maze of obstacles from a point of feed, each particle passing freely through the maze and colliding with certain obstacles, deflecting the individual particles laterally on each collision, the number of collisions being dependent upon the particle size, the larger particle being laterally deflected a greater distance than the smaller particles and collecting the particles at points laterally spaced from the points of feed progressively according to size.

2. The method of classifying comminuted material composed of a mixture of granular particles of different size which comprises passing the mixture in a stream through a maze of downwardly inclining obstacles from a point of feed, each particle passing freely through the maze and colliding with certain obstacles, whereby to deflect the individual particles laterally on each collision, the number of collisions being dependent upon the particle size, the larger particles being laterally deflected a greater distance than the smaller particles and collecting the particles at points laterally spaced from the points of feed progressively according to size.

3. The method of classifying comminuted material composed of a mixture of granular particles of different size which comprises passing the mixture in a stream through a maze of obstacles from a point of feed, each particle passing freely through the maze and colliding with certain obstacles, impacting the individual particles laterally on each collision, the number of collisions being dependent upon the particle size, the larger particles being laterally impacted a greater distance than the smaller particles and collecting the particles at points laterally spaced from the points of feed progressively according to size.

4. The method of classifying comminuted material composed of a mixture of granular particles of different size which comprises passing the mixture in a stream through a maze of downwardly inclining vibrating obstacles from a point of feed, each particle passing freely through the maze and colliding with certain obstacles, whereby to impact and deflect the individual particles laterally on each collision, the number of collisions being dependent upon the particle size, the larger particles being laterally deflected a greater distance than the smaller particles and collecting the particles at points laterally spaced from the points of feed progressively according to size.

FREDRIK KRISTIAN MOGENSEN.

REFERENCES CITED

The following references are of record in the file of this patent:

UNITED STATES PATENTS

| Number | Name | Date |
|---|---|---|
| 43,026 | Higley | June 7, 1864 |
| 174,392 | Turner | Mar. 7, 1876 |
| 402,462 | Laufenburg | Apr. 30, 1889 |
| 669,013 | Owens | Feb. 26, 1901 |
| 1,383,970 | Bentley | July 5, 1921 |
| 1,581,242 | Stebbins | Apr. 20, 1926 |
| 1,608,136 | Prichard | Nov. 23, 1926 |
| 2,080,884 | Anderson | May 18, 1937 |
| 2,118,796 | Orrison | May 24, 1938 |
| 2,260,095 | Stevens | Oct. 21, 1941 |
| 2,399,280 | McDonell | Apr. 30, 1946 |

FOREIGN PATENTS

| Number | Country | Date |
|---|---|---|
| 9,260 | Great Britain | June 6, 1896 |